United States Patent Office
3,430,203
Patented Feb. 25, 1969

3,430,203
TRAINABLE DECISION SYSTEM UTILIZING METAL-OXIDE-SEMICONDUCTOR FIELD EFFECT TRANSISTORS

Robert H. Crawford, Richardson, Tex., assignor to Texas Instruments Incorporated, Dallas, Tex., a corporation of Delaware Filed June 28, 1966, Ser. No. 561,161
U.S. Cl. 340—172.5 8 Claims
Int. Cl. G11b *13/00*

ABSTRACT OF THE DISCLOSURE

Disclosed in a trainable decision circuit that allows symmetrical operation when both positive and negative input values are applied to an adaptive element; the circuit produces an analog weight factor dependent upon the circuits previous experience in a training program. When a metal-oxide-semiconductor transistor is used as the adaptive element, the trainable circuit insures that the metal gate of the transistor is always at the same potential as the most negative terminal of the transistor for a P-channel transistor or the most positive terminal for an N-channel transistor, in order to assure symmetrical operation when using both positive and negative input voltages.

This invention relates generally to trainable decision systems which are also known as self-organizing systems, learning machines, or adaptive systems, and more particularly relates to a system utilizing a semiconductor adaptive element such as described in copending application Ser. No. 387,618, entitled "Trainable Decision System and Adaptive Memory Element," filed on Aug. 5, 1964, by Meadows et al. and now abandoned.

Trainable decision systems have been extensively explored during the past several years. The heart of any trainable system is an adaptive element which produces an analog weight factor dependent upon the system's previous experience in a training program. In its simplest form, the adaptive component is merely a resistance, the value of which may be selectively increased or decreased by an analog quantity, and the value of which may be read out without materially changing the value of the resistance. In the above-referenced copending application, an adaptive element is disclosed and claimed which has a resistance value that may be varied by applying the combination of a polarization enabling energy and a polarizing field. The polarization enabling energy may be either heat or a radiant energy, such as ultraviolet light.

A principal object of this invention is to provide circuitry for automatically operating an adaptive element of the type mentioned above in a trainable decision system so that symmetrical operation is maintained for both positive and negative input values. The adaptive element described in the referenced application has a configuration corresponding to a metal-oxide-semiconductor (MOS) transistor with the oxide being a poor grade material, from a transistor standpoint, which exhibits electret properties. The present invention is conceived with a circuit for effectively using these adaptive elements to provide a trainable decision system. More specifically, the trainable system includes means to insure that the metal gate is always at the same potential as the most negative terminal of the device for a P channel element, or the most positive terminal for an N channel device in order to assure symmetrical operation when using both positive and negative input voltage. Circuit means is also provided to insure that no current is passing through the channel of the element during the adapt cycle, thus insuring that the residual field established in the electret will be uniform over its entire length. Circuit means is also provided to apply a bias of the correct potential to the metal electrode to adapt the element in the proper direction based on the input to the element, the output of system, and the correct output for the system, as well as a basic majority vote taking system.

For a more complete understanding of the present invention and for further objects and advantages thereof, reference may now be had to the following description taken in conjunction with the accompanying drawings in which.

Figures 1, 2, 3:
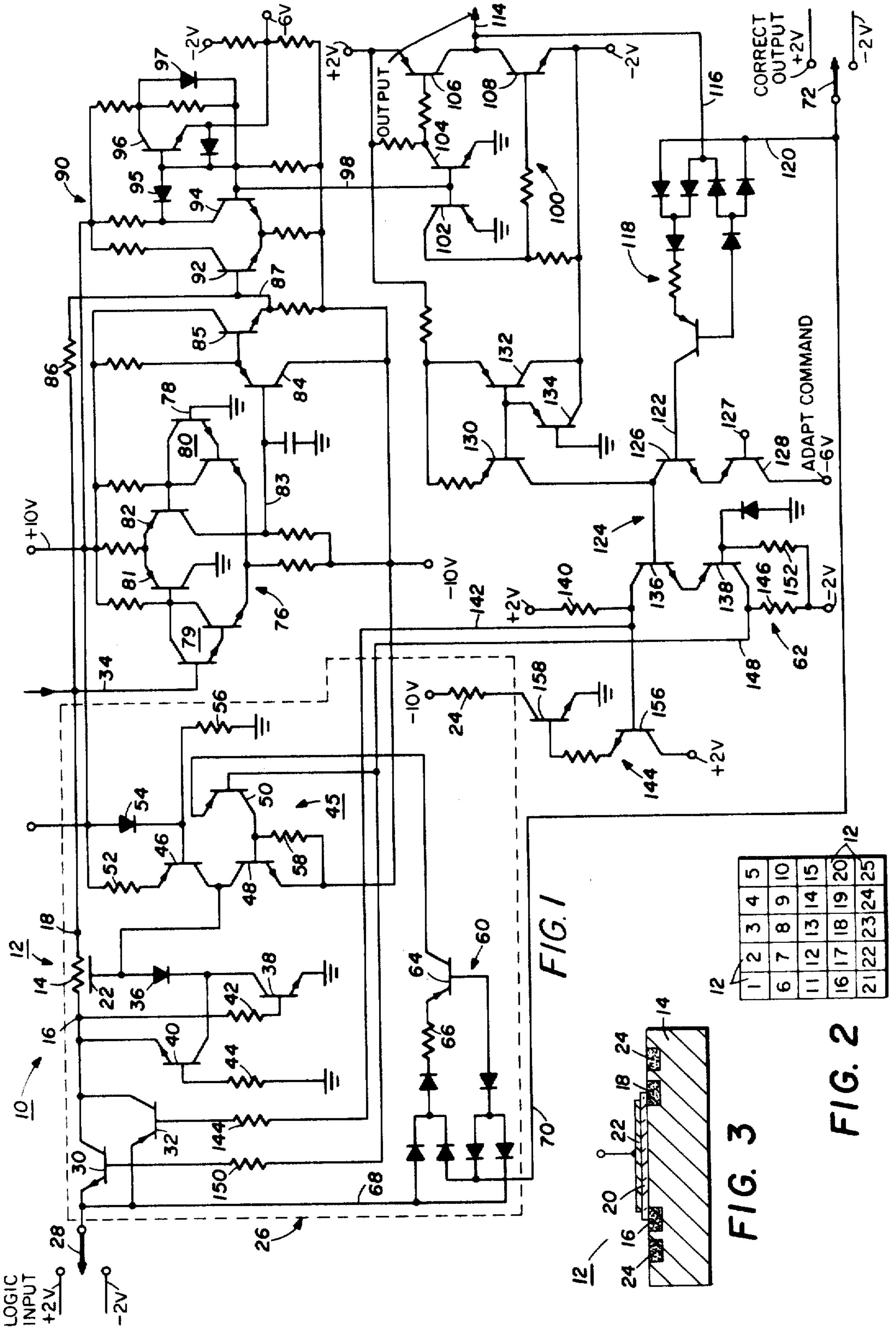
FIGURE 1 is a schematic circuit diagram of a system constructed in accordance with the present invention.
FIGURE 2 is a schematic representation of a pattern matrix for the system of FIGURE 1.
FIGURE 3 is a sectional view of an adaptive element used in the system of FIGURE 1.

Referring now FIGURE 1, a trainable decision system constructed in accordance with the present invention is indicated generally by the reference numeral 10. When used for pattern recognition or classification, the system 10 has a plurality of adaptive elements 12, for example twenty-five elements, which may be representative of a 5 x 5 pattern matrix as illustrated schematically in FIGURE 2.

Each of the adaptive elements 12 is a device such as described and claimed in the above-referenced copending application, and is comprised of a semiconductor body 14 having diffused regions 16 and 18 of the opposite conductivity type. An electret material 20 is formed in a thin layer over the surface of the semiconductor body 14 between the diffused contact regions 16 and 18. The electret material is typically silicon oxide and may be selectively enabled, such as by radiant energy, or by heat as in the embodiment herein illustrated. A thin electrode 22 is formed on the surface of the electret 20 and extends between the two diffused regions 16 and 18. For the latter purpose, a heater resistor 24 is formed, such as by diffusion, in the semiconductor body 14. The resistance of the semiconductor body 14 between the contact regions 16 and 18 is controllable as a result of the controlled modification of a surface inversion layer under the electret material.

The resistance of the channel region of body 14 between the diffused contact regions may be varied by heating the element to a temperature substantially above the normal operating temperature, such as for example from an operating temperature of about 60° C. to an adapt temperature of about 250° C., and subjecting the electret material to an electric field by applying a voltage to the electrode 22. When the semiconductor body 14 is p-type and the diffused contact regions 16 and 18 are n-type, i.e., the element has an n-type channel, the resistance of the element may be decreased by heating the element to a high temperature while biasing the electrode 22 positive with respect to the semiconductor body 14. Conversely, the resistance of the device may be increased by making the electrode negative with respect to the semiconductor body 14 while the element is heated.

The portion of the circuitry outlined by dashed lines and designated as 26 in FIGURE 1 is repeated twenty-five times, one such circuit being provided for each element 12. The voltage input for each of the adaptive elements is represented generally by the switch 28 which may be selectively connected either to a +2.0 v. source or a −2.0 v. source. Only digitalized inputs of +2.0 v. or −2.0 v. will be considered, although for many applications it will be desirable to use analog inputs ranging between positive and negative extremes to more accurately represent the pattern to be recognized. The input voltage is connected through a logic controllable switching means comprised of transistors 30 and 32 to terminal 16 of the element 12. The other terminal 18 of the element is connected to the input 34 of a summing amplifier presently to be described.

The electrode 22 is connected through a diode 36 and a transistor 38 to ground, which is essentially the potential of input 34 and therefore of terminal 18 of the element 12, as will hereafter be described in greater detail, and by transistor 40 to terminal 16. The purpose of transistors 38 and 40 is to insure that the gate 22 is at a potential corresponding to the most negative of the terminals 16 and 18, thus maintaining symmetrical operation for both positive and negative input voltages. For this reason, the base of transistor 38 is connected to terminal 16 by resistor 42, and the base of transistor 40 is connected to ground, and therefore to terminal 18, through resistor 44. When the input voltage is positive, the base-emitter junction of transistor 38 is therefore forward biased and the gate electrode 22 is essentially connected to terminal 18, which is, of course, more negative than terminal 16. On the other hand, when the input voltage is negative, the base-emitter junction of transistor 40 will be forward biased, thereby connecting the gate electrode 22 to terminal 16, the more negative of the two terminals.

The diode 36 permits the gate 22 to be biased negatively by a training circuit indicated generally by the reference numeral 45 and comprised essentially of transistors 46, 48 and 50. The emitter of transistor 46 is connected through resistor 52 to a positive voltage supply terminal +10.0 v. The collectors of transistors 46 and 48 are common, and are connected to the gate electrode 22. The base of transistor 46 is connected through diode 54 to the positive voltage supply +10.0 v. and through resistor 56 to ground. Thus, the base of transistor 46 is always at a positive reference potential. The base of transistor 48 is driven by current through transistor 50, and resistor 58 interconnects the base and emitter of transistor 48 to prevent the leakage current from transistor 50 from turning transistor 48 on. Transistor 50 is turned on by an output current from an exclusive OR gate, indicated generally by the reference numeral 60, plus the absence of a positive voltage from an AND gate circuit indicated generally by the reference numeral 62, which normally reverse biases the base of transistor 50.

The exclusive OR gate 60 is comprised of transistor 64, resistor 66, and six diodes connected as illustrated. One input 68 of the exclusive OR gate is connected to the voltage input 28 for the element 12, and the other input 70 of the gate is connected to a logic input 72 for the logic value representing the class to which the particular pattern being classified belongs, and corresponds to the correct or desired output for the system. The exclusive OR gate 60 has an output current when the voltages on the inputs 68 and 70 are different, but has no output current when the inputs are the same. For example, when the inputs 68 and 70 are at a logic "1" level of +2.0 volts, the base of transistor 64 is at approximately the same voltage as the emitter, and the transistor is turned off. The same is true if both inputs 68 and 70 are at a logic "0" level of −2.0 volts. However, if input 68 is at a logic "1" level of +2.0 volts and input 70 is at a "0" logic level of −2.0 volts, or if input 68 is at logic "0" and input 70 is at logic "1," the base emitter junction of transistor 64 will be forward biased as a result of the diodes and an output will result.

As mentioned, the outputs from the twenty-five adaptive elements 12 are connected to the input 34 of a summing amplifier indicated generally by the reference numeral 76. The amplifier 76 is a conventional operational amplifier in which the other input 78 is connected to ground for reference. The amplifier 76 has Darlington pair input transistors 79 and 80 which drive second stage amplifiers 81 and 82, respectively. The output 83 of the second stage drives a first emitter-follower stage 84, which drives a second emitter-follower stage 85. The output 87 of the last stage 85 and thus of the amplifier is connected by feedback resistor 86 to the input 34. Because of the feedback resistor 86 and the high gain amplifier 76, negligible voltage is developed between the inputs 34 and 78 until such time as the total current through the twenty-five adaptive elements 12 saturates the amplifier, and therefore the input 34 is essentially at ground potential during normal operation. The voltage at the output 87 is the product of the sum of the input currents and the feedback resistor 86. The output 87 is connected to the input of a level detector indicated generally by the reference numeral 90.

The level detector 90 is a differential amplifier comprised of transistors 92 and 94 which uses a positive feedback loop comprised of Zener diode 95, transistor 96 and diode 97 for regenerative switching. The level detector 90 functions as both a level detector for sensing the levels of +1.0 volt and −1.0 volt, and also functions as a memory which stores the output prior to the adapt cycle as will presently be described. Assume that the output 98 is initially at −2.0 volts. As the input to the base of transistor 92 is increased positively from 0.0 volt, the output 98 remains at −2.0 volts until the input reaches +1.0 volt. Then the transistor 96 is switched on as the reverse breakdown voltage of the Zener diode 95 is exceeded, thus causing the collector of transistor 96 to become more negative and switch transistor 94 off. Then as the input to the base of transistor 92 goes negative the output remains at a negative level until −1.0 volt is reached, then transistor 94 is switched on and transistor 96 is switched off, thus making the output of the level detector go to +2.0 volts.

The summing amplifier 76 and level detector 90 function as a single vote taker for the number of adaptive elements which are connected to the input 34. One or more vote takers may be used to form more complex decision making systems than are herein described, as desired, using either pure logic gates or one or more matrices of adaptive elements.

The output 98 is connected to the bases of a complementary pair of transistors 102 and 104 which control transistors 106 and 108 of the power amplifier 100. When the output 98 is at +2.0 volts, transistor 102 is switched off and transistor 104 is conductive. This saturates transistor 106 and turns transistor 108 off so that the output 114 is at essentially +2.0 volts. On the other hand, when the output 98 from the level detector is at −2.0 volts, transistor 102 is conductive and transistor 104 is turned off, thus turning transistor 106 off and saturating transistor 108 so that the output 114 is at essentially −2.0 volts. The output 114 may be connected to any suitable indicator means (not illustrated) for indicating the results of the majority vote taker circuit comprised of the summing amplifier 76 and level detector 90.

The output 114 of the power amplifier is also connected to one input 116 of a second exclusive OR gate 118 which is identical to the gate 60. The other input 120 of the second exclusive OR gate is connected to the voltage input 72. The exclusive OR gate 118 produces positive output current at the output 122 when the voltages at the inputs 116 and 120 are different, and produces no output when the voltages at the inputs are the same.

The output 122 is connected to the base of transistor 126 which serves as one input of an AND gate indicated generally by the reference numeral 124. The base 127 of a second transistor 128 is the other input of the AND gate, and this input is the adapt command input for the system. The adapt command is a negative going pulse for turning transistor 128 on, as will presently be described. A transistor 130 acts as a current source to direct current through transistors 126 and 128. Transistors 132 and 134 drive the base of transistor 130 in such a manner as to provide a constant current through the transistor 130. When both transistors 126 and 128 are turned off, the current from transistor 130 is diverted to the base of transistor 136, thus turning both transistors 136 and 138 on. The output 142 is connected through resistor 144 to the base of transistor 32, and the output 148 is connected through resistor 150 to the base of transistor 30.

As a result of the voltage divider between the +2.0 volt and −2.0 volt supply terminals by resistors 140 and 146 and transistors 136 and 138, the outputs 142 and 148 are at essentially ground potential when transistors 136 and 138 are turned on, thus turning either transistor 30 or 32 on depending upon input polarity. When both transistors 126 and 128 are turned on, transistors 136 and 138 are turned off. Then the output 142 is essentially connected to the +2.0 volt terminal and output 148 is essentially connected to the −2.0 volt terminal. This condition turns transistors 30 and 32 off.

The output 142 is also connected to the base of transistor 156 so that when transistors 136 and 138 are turned off, transistor 156 will be turned on, thereby turning transistor 158 off. When transistor 158 is turned off, current through resistor 24, which it will be recalled is the diffused heater resistor on the element 12 as illustrated in FIGURE 3, is turned off.

Assume now that the system 10 is to be used to classify patterns which may be defined in terms of black and white areas in the squares of the matrix illustrated in FIGURE 2 by giving the black squares a logic "1" value of +2.0 volts and the white squares a logic "0" value of −2.0 volts. Assume also that the classification is to be based upon the arbitrary assignment of one half of the patterns to a class represented by a logic "1" level of +2.0 volts at the output 114, and the other half to a class represented by the logic "0" level of −2.0 volts at the output. The first pattern is then reproduced by logic levels at the twenty-five inputs 28. Initially, the adapt command input 127 will be at a sufficiently positive potential to keep transistor 128 turned off so that transistors 136 and 138 will be turned on. This in turn keeps transistor 30 or 32 turned on, and transistor 156 turned off and transistor 158 turned off to block current through the heater resistor 24. For the elements 12 having a logic "1" input of +2.0 volts, current will flow through transistor 32 and through the adaptive elements 12 to the summing junction 34. Since the terminal 16 is positive with respect to ground, transistor 40 will be turned off and transistor 38 will be turned on so that the gate electrode 22 will be connected to ground, which is essentially the same potential as terminal 18. For the elements 12 having logic "0" inputs of −2.0 volts, the current will flow from the summing input 34 through the adaptive element 12 and through transistor 30. Since terminal 16 is more negative than ground, transistor 40 will be turned on and transistor 38 will be turned off, and the gate electrode 22 will be connected through diode 36 and transistor 40 to terminal 16, which is more negative than terminal 18. Thus, as a result of transistors 38 and 40, the electrode 22 is always biased at approximately zero volt with respect to the control terminal 16 or 18, that is the terminal that is most negative, and the elements are operated under symmetrical conditions for both positive and negative inputs. During readout, the adaptive elements behave essentially as fixed resistors.

The sum of all of the currents through the adaptive elements 12 is then applied to the input 34 of summing amplifier 76. If the sum of the currents is sufficient to make the output 87 of the amplifier 76 higher than +1.0 v., then the output 98 of the level detector 90 will be at +2.0 volts. On the other hand, if the sum of the currents to the input 34 of the amplifier 76 is sufficiently negative that the voltage at the output 87 is less than −1.0 volt, then the output 98 will be at a logic "0" level of −2.0 volts. If the voltage at the output 87 is between −1.0 volt and +1.0 volt, the output 98 of the level detector 90 will remain at whatever level existed prior to the application of the set of inputs to the elements.

The output 114 follows the output 98. If the output 114 is the same as the desired or correct output established by setting input 72, i.e., is the output representative of the class to which the pattern has been assigned, then no further action is taken and the next pattern of the training set is set up on the inputs 28. If, however, the logic level at output 114 is incorrect, i.e., different from input 72, then the exclusive OR gate 118 will produce an output current to the bases of transistor 126. Then when an adapt command is applied to the input 127 of the AND gate 62, both transistors 126 and 128 will be turned on, thereby turning transistors 136 and 138 off. This applies a positive voltage to the bases of all transistors 32 and a negative voltage to the bases of all transistors 30 of the twenty-five elements 12, and these transistors are turned off to isolate all of the inputs 28 from the respective elements 12. The input 34 is then essentially open circuited, but is clamped essentially to ground by the feedback resistor 86, so that the output 87 is essentially at ground potential. As a result, the output 98 of the level detector does not change and the output of the gate 118 is not changed. Transistor 156 is also turned on, thus turning transistor 158 on to pass current through the heater resistor 24 and heat the adaptive element 12 to the adaptation temperature, which is typically 250° C.

As a result of the output at 148, the base of transistor 50 is reduced to approximately −2.0 v. to enable the training circuit 45. If the voltage at the input 28 is the same as the voltage at input 72 (the correct output), then exclusive OR gate 60 has no output, and transistor 50 remains nonconductive so that transistor 48 is turned off. Then the current from transistor 46 must pass through the high impedance of transistors 48, 38, and 40 and the gate electrode 22 is biased with a positive voltage of approximately +10.0 v. with respect to terminal 18 which is at ground. As a result, the resistance of the particular adaptive element 12 is decreased, i.e., the element is rewarded, because it is contributing to the correct answer.

On the other hand, for those elements where the voltage at the input 28 is different from the voltage at the input 72, the exclusive OR gate 60 produces an output so that transistor 50 is turned on, thus turning transistor 48 on. This connects the gate electrode 22 almost directly to the negative voltage supply terminal −10.0 v. The diode 36 blocks current and permits the gate electrode 22 to go negative. As a result of the negative potential applied to the gate electrode 22, the resistance of the element 12 is increased, i.e., the element is punished, because it is not contributing to the correct answer.

After a short period, the adapt command is removed from input 127, and the system returns to the classification mode. Then if the voltage at output 87 of the summing amplifier is sufficient to change the state of the output 98 of the level detector, the adapting procedure is terminated. If not, the adapt command is repeated until the output 114 coincides with the correct output level applied through input 72. The other patterns of the training set are then applied to the inputs and this adapt procedure repeated for each pattern. The set of patterns are cycled through the system until the system makes a minimum number of errors, at which time the system is said to be trained. Then new patterns may be classified in accordance with the previous training based upon the training set.

The embodiment of the invention herein described is but a single majority vote taking system. The number of adaptive elements for a particular majority vote system may be increased as desired, and the outputs of many separate majority vote systems may be combined to provide the inputs to other majority vote takers, or to standard logic circuits. Although a preferred embodiment of the invention has been described in detail, it is to be understood that various changes, substitutions and alterations can be made therein without departing from the spirit and scope of the invention as defined by the appended claims.

What is claimed is:

1. In a trainable decision system, the combination of: a plurality of adaptive elements each having a semiconductor channel with first and second terminals either one of which may be the reference terminal depending upon the polarity of an input voltage applied to the first terminal, and an adapt electrode means for changing the resistance of the channel when biased with an adapt voltage, input circuit means connected to the first terminal of each element for applying positive and negative input voltages selectively to each of the respective first terminals, reference circuit means for each element responsive to the input voltage applied to the respective element for automatically connecting the adapt electrode means to the reference terminal of the element, current summing means connected to the second terminals of all of the elements for algebraically summing the currents through all of the elements, level detector means connected to the output of the current summing means for producing first and second logic level outputs based upon the level of the output of the current summing means, correct answer input means for establishing a first and second voltage level representative of first and second classes for a set of input voltages, and training circuit means responsive to the output of the level detector means, and the correct answer input means, and the input voltage of each element for applying a voltage to the adapt electrode means of a polarity such as to decrease the resistance of the channel when the input voltage to the element corresponds to the correct answer and to increase the resistance of the channel when the input is different from the correct answer.

2. The combination defined in claim 1 wherein the reference circuit means comprises:

a first transistor the emitter of which is connected to the first terminal, the collector of which is connected to the adapt electrode means and the base of which is connected to the second terminal, and a second transistor the emitter of which is connected to the second terminal, the collector of which is connected to the adapt electrode means, and the base of which is connected to the first terminal.

3. The combination defined in claim 2 wherein:

the collectors of the first and second transistors are connected through rectifier means to the adapt electrode means to permit both positive and negative voltages to be applied to the electrode means when the first and second transistors are turned off, switch means for disconnecting the first terminals from the respective input circuit means, and wherein the training circuit means comprises logic controllable switching means for each adaptive element for alternatively connecting the adapt electrode to a positive voltage supply and a negative voltage supply in response to first and second logic conditions, and logic circuit means connected to the training circuit means for producing the logic condition necessary to decrease the resistance of the element when the logic level produced by the level detector and the logic level of the correct answer input means are different and the input voltage at the element corresponds to the correct answer input and to increase the resistance of the element when the logic level produced by the level detector and the logic level of the correct answer input means are different and the input voltage at the element is different from the correct answer input.

4. The combination defined in claim 3 wherein the logic circuit means comprises:

first exclusive OR gates means having one input connected to the output of the level detector means and the other input connected to the correct answer input means and the output being connected to open the switch means to disconnect all of the first terminals from the respective input circuit means and being connected to enable the logic controllable switching means of all of the elements, and a second exclusive OR gate means for each element, one input of each of the second exclusive OR gate means being connected to the correct answer input means and the other input being connected to the respective input circuit means, the output being connected to operate the logic controllable switching means.

5. The combination defined in claim 4 wherein the output of the first exclusive OR gate is connected through an AND gate to open the switch means and enable the logic controllable switching means, and the other input of the AND gate is connected to receive an adapt command.

6. The combination defined in claim 5 wherein the logic level detector is further characterized by retaining the same output voltage level when the switch means are opened to disconnect all of the first terminals from the respective input circuit means.

7. In a trainable decision system, the combination of:

an adaptive element having a semiconductor channel with first and second terminals, an electret overlying the channel and an adapt electrode overlying the electret, a first transistor the collector of which is connected to the adapt electrode, the emitter of which is connected to the first terminal and the base of which is connected to the second terminal, and a second transistor of the same type the collector of which is connected to the adapt electrode, the emitter of which is connected to the second terminal and the base of which is connected to the first terminal.

8. The combination defined in claim 7 wherein:

the collectors of the first and second transistors are connected to the adapt electrode through rectifying means oriented in the same direction as the transistors which in combination with the first and second transistors permit the adapt electrode to be biased either positively or negatively when the transistors are turned off, and further characterized by third and fourth transistors the collectors of which are common and are connected to the adapt electrode, the emitter of the third transistor being connected to a voltage supply of one polarity and the emitter of the fourth transistor being connected to a voltage supply of the other polarity, the base of the one of the third and fourth transistor that is connected to forward bias the rectifier means being connected to a reference potential such that the transistor will be always turned on, and the base of the other of the thid and fourth transistor being a logic control input, such that the transistor may be selectively switched on and off, and switching means for selectively connecting said disconnecting the adaptive element for a voltage input signal.

References Cited

UNITED STATES PATENTS

| | | | |
|---|---|---|---|
| 2,791,760 | 5/1957 | Ross | 340—173 |
| 2,791,761 | 5/1957 | Morton | 340—173 |
| 3,341,821 | 9/1967 | Kessler | 340—172.5 |

PAUL J. HENON, *Primary Examiner.*

J. C. VANDENBURG, *Assistant Examiner.*

U.S. Cl. X.R.

340—173; 307—201